United States Patent [19]

Yount, III

[11] 4,162,143

[45] Jul. 24, 1979

[54] EMULSIFIER BLEND AND AQUEOUS FUEL OIL EMULSIONS

[75] Inventor: Joseph B. Yount, III, Newark, Del.

[73] Assignee: ICI Americas Inc., Wilmington, Del.

[21] Appl. No.: 885,758

[22] Filed: Mar. 13, 1978

[51] Int. Cl.$^2$ .............................................. C01L 1/32
[52] U.S. Cl. ........................................ 44/51; 44/71; 44/75; 252/311.5; 252/356; 252/357
[58] Field of Search .......................... 44/51, 74, 71, 75; 252/311.5, 356, 357

[56] References Cited

U.S. PATENT DOCUMENTS

| | | | |
|---|---|---|---|
| 3,527,581 | 9/1970 | Brownswell et al. | 44/51 |
| 3,642,623 | 2/1972 | Bennett et al. | 252/357 |
| 3,668,129 | 6/1972 | Willett | 252/357 |
| 4,002,435 | 1/1977 | Wenzel et al. | 44/51 |

Primary Examiner—Patrick Garvin
Assistant Examiner—J. V. Howard
Attorney, Agent, or Firm—Richard A. Rowe; Roger R. Horton

[57] ABSTRACT

The present invention is directed to water-in-oil type fuel oil emulsions which are particularly useful in firing boilers in ships, locomotives and industrial power plants. Furthermore, the invention is directed to aqueous particulate slurries dispersed in fuel oil. Specifically, the invention is directed to aqueous/oil slurries of combustible or non-combustible particulate having improved burning characteristics. Of specific interest are stable aqueous/oil slurries of coal dust. These emulsions and slurries are achieved through the use of a novel blend of cationic, nonionic and anionic surfactants to which the invention is also directed.

30 Claims, No Drawings

EMULSIFIER BLEND AND AQUEOUS FUEL OIL EMULSIONS

The present invention is directed to water-in-oil type fuel oil emulsions which are particularly useful in firing boilers in ships, locomotives and industrial power plants. Furthermore, the invention is directed to aqueous particulate slurries dispersed in fuel oil. Specifically, the invention is directed to aqueous slurries of combustible or non-combustible particulate which improve the burning characteristics of fuel oil. Most specifically the invention is directed to a blend of cationic, nonionic and anionic surfactants useful in forming water-in-fuel oil emulsions. Of specific interest is the improvement of fuel oil by the suspension therein of stable aqueous slurries of coal dust.

In view of the recent sharp increase in the worldwide consumption of petroleum products, it becomes urgent that either new sources of oil be discovered and/or known sources be conserved. Because of the superabundance of coal renewed interest in the exploitation of it, as a prime energy source, is gaining momentum. However, since modern furnaces have been designed to operate most efficiently by fueling them with petroleum products and are equipped with oil stoking apparatus, it is quite expensive to convert them over to 100% coal burning furnaces. In recent years industry has been experimenting with compromise solutions for burning coal in oil burning facilities and has been marginally successful in burning coal dust along with fuel oil as a fuel oil/coal dust slurry. However, problems are encountered with coal dust/fuel oil slurries in that the coal has a tendency to settle to the bottom of the vessels in short periods of time. In other experiments attempts to use aqueous slurries of coal dust have been unsuccessful as fuels for firing boilers.

It is further contemplated that oil slurries containing suspended noncombustible catalysts can be found useful for gasification and liquification in second generation oil/gal and Fischer-Tropsch conversion processes.

Another problem associated with burning oil and coal is the formation of oxides of nitrogen which add to atmospheric pollution and smog forming gases. It is well known (U.S. Pat. No. 3,606,868) that oxides of nitrogen are reduced in the combustion of aqueous emulsions of petroleum products, such as gasoline and kerosene, and it follows that nitrogen oxides would be expected to be reduced by the incorporation of water with fuel oil. Furthermore, fuel-water emulsions for use as fuels have been described in U.S. Pat. Nos. 2,111,100; 1,614,735; 3,311,561; 2,152,196; 2,461,580; and 3,527,581.

Lump coal has been treated with aqueous fuel oil emulsions as a means for increasing density (U.S. Pat. No. 3,563,714), however, the present invention is directed to coal suspensions.

It is an object, therefore, of this invention to provide stable aqueous emulsions of fuel oil which are useful in stoking commercial boilers.

It is another object of the invention to provide fuel oil emulsions containing aqueous slurries of particulate materials useful in promoting fuel oil combustion or cracking.

Furthermore, it is an object of the invention to provide stable water-in-fuel oil emulsions of porous coal dust wherein substantially all the dust is located in aqueous phase.

Another object of the invention is to provide a novel emulsifier comprising a blend of surfactants for use in preparing stable aqueous fuel oil emulsions.

The foregoing objects, and still further objects, and advantages of the invention are achieved by providing a unique blend of prior known cationic, nonionic and anionic surfactant compounds.

The major ingredient, a known corrosion inhibitor, is a cationic surfactant which is made by condensing an alkyl or cycloalkyl phenol with an aldehyde, a polyamine and certain carboxylic acids. These chemical combinations are described in U.S. Pat. No. 3,280,097, and are characterized by the following general formula:

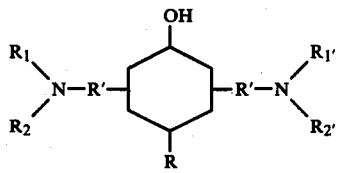

wherein R is an alkyl or cycloalkyl radical having from 4 to 12 carbon atoms, wherein R' is a divalent alkylene radical, wherein $R_1$ and $R_1'$ are each selected from the group consisting of hydrogen and an acyclic hydrocarbon radical having from 1 to 18 carbon atoms, and wherein $R_2$ and $R_2'$ are each heterocyclic hydrocarbon radicals containing from 1 to 3 primary or secondary amine groups, either or both, each of said groups being separated from another by from 2 to 6 carbon atoms.

Compounds of the foregoing type may be prepared by condensation of a polyamine having primary or secondary amino groups with an alkyl phenol and an aldehyde to form a molecule having two or more amine groups of primary or secondary type.

The phenolic compound may be selected from a wide variety of alkyl or cycloalkyl phenols and may include for example, para-t-butyl, para-t-amyl, para-t-nonyl, cyclohexylphenol, octylphenol, decylphenol, and dodecylphenol. Likewise, the aldehyde may similarly be selected from a numerous group aldehydes such as, formaldehyde, acetaldehyde, propionaldehyde, butyraldehyde and the like; R' in the above formula, for example, may be a methylene radical of paraformaldehyde.

Representative polyamines which may be used in the preparation of the condensation products characterized by the foregoing formula include alkylene polyamines such as diethylenetriamine, N-tallow propylenediamine (Armour Duomeen T) or a condensation of diethylenetriamine. Other suitable polyamines are dipropylenetriamine, ethylenediamine, 9 amino-10 hydroxystearylamine and, in general, polyamines containing 2 or more amine groups of either primary or secondary nature, or both.

Among the derivatives of the condensation products of alkyl or cycloalkyl phenols, aldehydes and polyamines which are useful in the preparation of surfactant compositions used in the present invention are classes of alkylene oxide adducts of the aforesaid condensation products which include (a) preparations with a number of mols of alkylene oxide sufficient to react with the active hydrogen to convert completely all the primary and secondary amino groups of the condensation product to tertiary amine and (b) preparations with a number of mols of alkylene oxide which are sufficient to convert only a part of all the available primary and secondary amino groups of the polyamine condensation products to tertiary amine. Representative of alkylene oxides which may be used in the alkoxylation of the polyamine condensation product are ethylene oxide and propylene oxide. Adducts of butylene oxide and mixtures of alkylene oxides may also be used.

Another class of derivatives useful in the formulation in accordance with the present invention are organic acid esters of the above-described alkylene oxide adducts of polyamine condensation products. Typical of the acids which may be used to form esters of the aforementioned alkylene oxide adducts is tall oil acid. Esters prepared by using other organic acids including water-soluble, oil-soluble, saturated unsaturated, cyclic, acyclic, monobasic and polybasic acids may be used. In general, in accordance with the present invention, the mol ratio of organic acid to alkylene oxide adduct of polyamine condensation product is such that one carboxyl group of the acid is reacted in the presence of from 10 to 1 hydroxyl groups in the adduct.

Organic acid salts of the condensation products of alkyl or cycloalkyl phenols, aldehydes and polyamines of the present invention, their alkylene oxide adducts and the organic acid esters of said adducts also constitute a preferred class of derivatives useful in the formulation of the emulsifier blends. A variety of organic acids may be used to form suitable salts with the aforementioned polyamine condensation products and their derivatives. Illustrative of such organic acid salts for example, are various dimer acid salts, castor-phthalate salts, and tall oil salts and fatty acid salts of acids in general having 8 to 22 carbon atoms.

The dimeric derivatives of fatty acids suitable for use in the preparation of compositions in accordance with the present invention are the condensation products or dimers of two molecules of fatty acid. Mixtures of the dimers with monomeric acids or mixtures of dimeric acids are also suitable. Dimers of suitable fatty acids are obtained, for example, as a by-product of sebacic acid. Dimeric acids suitable for use in the practice of the present invention may be prepared by any of the methods described in the U.S. patent to Goebel, No. 2,482,761 or the U.S. patent to Landis, No. 2,632,695. Suitable polymer acids for the purpose of the present invention are polymerized di-unsaturated mono-carboxy acids, e.g., dilinoleic acid and the dimeric acids obtained by the dry distillation of castor oil in the presence of sodium hydroxide. Suitable dimer acids are a commercial form of a dimeric polymer consisting essentially of dilinoleic acid. The method used in their preparation is set forth in the Journal of the American Oil Chemists Society, 24, 65 (March 1947). Specifications are as follows:

| | |
|---|---|
| Neutral equivalent | 290–310 |
| Iodine Value | 80–95 |
| Color | Gardner 12 max. |

| -continued | |
|---|---|
| Dimer content | Approx. 85% |
| Trimer and higher | Approx. 12% |
| Monomer | Approx. 3% |

The polyamine condensation products may be prepared by means of a reaction, the mechanics of which are believed to involve, although not necessarily completely those of the well-known "Mannich" reaction whereby primary or secondary polyamine, or both, condensed to alkyl or cycloalkyl phenols with an aldehyde, form a molecule having two or more amine groups of primary or secondary type. The polyamine condensation is effected by blending the polyamine and alkyl or cycloalkyl phenol to a uniform dispersion, or solution, depending upon the solubility of the reactants. If necessary, the mixture is heated to liquefy the reactants. The aldehyde is then added at room temperature to the reactants after the amine has been wetted by the phenolic compound. Heat but no catalyst is required to obtain condensation. The reaction is carried out at room temperature which, however, may rise to as high as 215° C. at the termination of the reaction. Condensation is considered complete when one mol of water is driven off for each mol of reactant aldehyde.

The following are specific examples of the preparation of condensation products of polyamines, aldehydes and alkyl or cycloalkyl phenols useful in the blends of the present invention:

EXAMPLE A

To a suitable coverable vessel equipped with an agitator and a condenser cooling system such as a reaction kettle with cover and vent are added at room temperature 45.26 grams nonylphenol followed by 12.33 grams of paraformaldehyde after which the reactants are mixed to a uniform suspension. The agitator is then shut off and 42.41 grams diethylenetriamine is added to the vessel without further mixing. The vessel is closed, the vent opened and agitator turned on. Prior to adding the amine, the condenser cooling water is turned on. Exothermic reaction of the mixture in the vessel will carry the temperature to about 100° C., after which heat is slowly applied to the vessel. Continue applying heat to the vessel in such a manner that the desired temperature of 215° C. is reached after about 2 to 3 hours from the start of the exothermic reaction. Reaction is complete when 215° C. is reached. From 7.7% to 8.0% distillate (aqueous) based on the starting weight of the reactant materials will come over during the reaction. When the reaction has been completed the reaction product is cooled below 120° C. and is then ready for use.

Examples B to F in the following Table I illustrate the preparation of further polyamine condensation products according to method set forth in Example A wherein the reactant materials and the proportions thereof have been varied as indicated:

TABLE I.

POLYAMINE CONDENSATION PRODUCTS

| | Polyamine | | Aldehyde | | Alkyl Phenol | | Aqueous Distillate, ml | | Amine Analysis, percent | | |
|---|---|---|---|---|---|---|---|---|---|---|---|
| Example No. | Name | Wt., gms. | Name | Wt., gms. | Name | Wt., gms. | Theoretical | Actual | Primary | Secondary | Tertiary |
| B | Diethylene triamine. | 824 | Paraformaldehyde | 240 | Nonyl | 880 | 144 | 155 | 23 | 77 | 0 |
| C | " | 927 | " | 270 | p-t-Amyl | 738 | 162 | 187 | — | — | — |
| D | " | 1030 | " | 300 | p-t-Butyl | 750 | 180 | 193 | — | — | — |
| E | " | 109 | " | 60 | Nonyl | 220 | 36 | — | 12 | 88 | 0 |

TABLE I.-continued

POLYAMINE CONDENSATION PRODUCTS

| Example No. | Polyamine Name | Wt., gms. | Aldehyde Name | Wt., gms. | Alkyl Phenol Name | Wt., gms. | Aqueous Distillate, ml Theoretical | Actual | Amine Analysis, percent Primary | Secondary | Tertiary |
|---|---|---|---|---|---|---|---|---|---|---|---|
| F | N-tallow propylene diamine. | 740 | " | 60 | " | 220 | 36 | — | 15 | 56 | 29 |

In general, in the preparation of the types of alkylene oxide adducts of the condensation products of alkyl or cycloalkyl phenols, aldehydes and polyamines hereinbefore specified, from as little as one to as high as about three hundred mols of alkylene oxide may be added to the polyamine condensation product, in accordance with the present invention, by replacement of one or more of the active hydrogen atoms thereof. The alkylene oxide adducts of the polyamine condensation products are preferably prepared in an autoclave using a suitable catalyst such as sodium hydroxide or sodium methylate. Before addition of the alkylene oxide, the autoclave is purged free of oxygen contamination with nitrogen or natural gas and is then heated to a temperature within the range of about 100° C. to 150° C. Addition of the alkylene oxide to the polyamine condensation product is started at about 30 psig inert gas pressure in the autoclave and at a temperature within a range of about 100° C. to 160° C. Generally, 30 to 100 psig pressure is reported during alkylene oxide addition and the addition requires from about one to about ten hours reaction time.

The following are specific examples of the preparation of alkylene oxide addition products of the polyamine condensation products: Examples G to U in the following Table II illustrate the further preparation of alkylene oxide adducts of polyamine condensation products according to the method set forth in Example V, wherein the reactant materials and the proportions thereof have been varied as indicated.

EXAMPLE V 1.27 (50.8%) pounds of the polyamine condensation product of Example A and 3.0 grams of sodium hydroxide catalyst are charged to an autoclave using standard methods therefor and then moisture is bled from the reactor at a temperature of about 230° F. to 240° F. and at a 10% ethylene oxide rate of flow. The reaction is hot and precaution must be taken to prevent excessive temperature and pressure. Feeding of the ethylene oxide at the 15% flow rate is continued until a steady temperature and pressure have been attained. It should be noted that at this stage of the reaction, a temperature of about 300° F. and/or a pressure of about 60 psig should not be exceeded. After the temperature and pressure of the reaction have been brought under control, the flow rate of the ethylene oxide is increased to about 20% and thereafter gradually increased again to about 50% providing temperature and pressure are controllable during such increase.

Esters of alkylene oxide adducts of condensation products of an alkyl or cycloalkyl phenol, aldehyde and polyamine suitable for use in the practice of the present invention may be prepared in the conventional manner by reacting the aliphatic hydroxyl groups of the alkylene oxide chain of the adduct with the carboxyl group of a suitable organic acid of the kind hereinbefore detailed in the following Table III, Examples W to Z and a to c are illustrative of the preparation of representative esters which may be used in the present emulsifier blends.

TABLE II.

ALKYLENE OXIDE ADDUCTS OF POLYAMINE CONDENSATION PRODUCTS

| Example No. | Condensation product of- | Weight | Alkylene Oxide Ethylene Oxide | Alkylene Oxide Propylene Oxide | Analysis Acid No. | Analysis Amine Eq. | Analysis OH Value | Moles Oxide/Moles Resin Ethylene Oxide | Moles Oxide/Moles Resin Propylene Oxide |
|---|---|---|---|---|---|---|---|---|---|
| G | Example B | 3,003 | 736 | — | — | 149 | 749 | 3 | — |
| H | Example G | 2,735 | 533 | — | — | 181 | 693 | 6 | — |
| I | Example H | 2,268 | 370 | — | — | 199 | 595 | 9 | — |
| J | Example J | 1,638 | 228 | — | — | 201 | 524 | 12 | — |
| K | Example G | 3,276 | — | 2,088 | −.24 | 190 | 634 | — | 6 |
| L | Example K | 3,576 | — | 696 | −.95 | 232 | 533 | — | 9 |
| M | Example I | 2,136 | — | 348 | −.65 | 279 | 454 | — | 12 |
| N | Example B | 2,295 | 3,703 | — | −1.1 | 284 | 413 | 20 | — |
| O | Example N | 4,000 | 1,234 | — | −1.6 | 370 | 344 | 30 | — |
| P | Example O | 3,234 | 761 | — | −1.0 | 463 | 279 | 40 | — |
| Q | Example P | 1,995 | 350 | — | −0.9 | 547 | 249 | 50 | — |
| R | Example B | 1,921 | — | 4,079 | −2.5 | 368 | 344 | — | 20 |
| S | Example R | 4,000 | — | 1,361 | −1.9 | 500 | 258 | — | 30 |
| T | Example S | 3,351 | — | 854 | −1.8 | 650 | 210 | — | 40 |
| O | Example T | 2,215 | — | 448 | −1.3 | 766 | 180 | — | 50 |

TABLE III.

ESTERS OF ALKYLENE OXIDE ADDUCTS OF POLYAMINE CONDENSATION PRODUCTS

| Example No. | Alkylene Oxide Adduct | Wt. (gms.) | Tall oil, wt (gms.) | OH/COOM Ratio | Analysis Acid No. | Analysis Saponification No. | Analysis OH Value |
|---|---|---|---|---|---|---|---|
| W | Example L | 208 | 125 | 4.5 | 7.3 | 53 | 256 |
| X | Example M | 219 | 114 | 4.5 | — | — | — |

TABLE III.-continued
ESTERS OF ALKYLENE OXIDE ADDUCTS OF POLYAMINE CONDENSATION PRODUCTS

| Example No. | Alkylene Oxide Adduct | Wt. (gms.) | Tall oil, wt (gms.) | OH/COOM Ratio | Analysis Acid No. | Saponification No. | OH Value |
|---|---|---|---|---|---|---|---|
| Y | Example L | 237 | 96 | 6.0 | 5.7 | 40 | 314 |
| Z | Example N | 471 | 729 | 1.5 | 10.2 | 115 | 63 |
| a | Example O | 548 | 652 | 1.5 | 12 | 101 | 69 |
| b | Example P | 610 | 590 | 1.5 | 12.5 | 90 | 73 |
| c | Example Q | 653 | 547 | 1.5 | 16.7 | 83 | 73 |

Acid salts of the polyamine condensation products and derivatives thereof, as provided in accordance with the present invention, may be prepared in the conventional manner by agitating and circulating the reactant materials at a moderately elevated temperature for a period of time sufficient to permit the reaction to go to completion. Frequently it is desirable to allow the aforesaid reaction to take place in an inert solvent which also is used as a diluent for the inhibitor composition. An especially suitable solvent for this purpose is a heavy aromatic naphtha characterized by the specifications appearing in Table IV below:

TABLE IV
Aromatic Hydrocarbons Medium Boiling Range

| | |
|---|---|
| Boiling range °F. | |
| Initial | 367 |
| 50% | 378 |
| Dry point | |
| End point | 418 |
| Color Saybolt | 30 |
| Flash point °F. tag closed cup | 150 |
| Specific gravity at 60/60° F. | 0.893 |
| Weight per gallon, pounds | 7.44 |
| Mixed aniline point °F. | 69.4 |
| Kauri butanol value | 90 |
| Aromatics       percent | 93 |

The following examples illustrate the preparation of organic acid salts suitable to the purpose of the present invention:

EXAMPLE d

To a blending tank equipped with agitator are charged 9.477 pounds of heavy aromatic naphtha as solvent. The agitator is turned on and 1.166 pounds of the 12 dendro polyamine derivative of Example J and 1.485 pounds of dimer acid are added. The reaction mixture is heated to 150° F.-160° F. After circulating and agitating the reaction mixture for 2 hours within the aforesaid temperature range, the resulting product is cooled and discharged.

Examples e to i in the following Table V further illustrate the preparation of acid salts of polamine condensation products and derivatives thereof according to the method of Example d wherein the reactant materials and the proportions thereof have been varied as indicated:

Nonionic surfactants are selected from polyethers made be well-known techniques such as described in U.S. Pat. Nos. 3,036,118; 3,036,130; 3,031,510; 3,078,315; and 3,832,408 to name a few. These polyoxyalkylene glycol ethers are usually prepared by the addition of controlled quantities of ethylene oxide to a hydrophobe of minimum molecular weight made by the heteric addition of a mixture of 1,2-propylene oxide and ethylene oxide to an alkaryl, aliphatic or arylaliphatic mono, di or trihydroxy compound. All such reactions are carried out in the presence of acid or alkaline catalyst at temperatures in the range of 100 to 120° C. and pressures up to as high as 50 psi.

Starting materials for the manufacture of nonionic surfactants usually include aliphatic monohydroxy alcohols such as, n-butanol, 2 ethylhexanol, methanol, ethanol, and propanol, isobutanol, 2 ethylbutanol, and heptanol, isopropanol, ethylene glycol, propylene glycol, butylene glycol, glycerine and alkyl substituted phenols having at least 2 to 15 carbon atoms in the alkyl substituant. Of particular interest are polyoxyalkylene glycol ethers consisting of a hydrophobe moiety containing from 1 to 8 carbon atoms derived from an aliphatic alcohol having 1 to 8 carbon atoms. To this moiety is attached through an etheric oxygen linkage a heteric mix chain of oxyethylene and 1,2- oxypropylene wherein the weight ratio of oxyethylene groups to oxypropylene groups is within 5/95-15/85 and the average molecular weight of the hydrophobe is at least 1000. Attached to this mixed hydrophile to make the nonionic emulsifier is a chain of oxyethylene groups the weight ratio of the hydrophile to hydrophobe usually ranges from 0.8/1-1.2/1. In some instances where the hydrophobe unit contains alkyl substituted aromatic hydroxy containing molecules, the number of oxyethylene or oxypropylene per mol can range between 5 and 40 mols per molecule.

Nonionic surfactants having a molecular weight range from 500-5000 and preferably from 1500 to 3000 can be employed as single ingredients or as blends of high and low molecular weight materials.

Representative anionic surfactants useful in the blend are selected from alkyl, aryl and polyether esters of sulfuric, sulfonic and phosphoric acids and there alkaline metal, alkaline earth metal and alkylamine salts. For example, calcium dodecyl benzene sulfonate; polyoxy-

TABLE V

| Example No. | Polyamine Derivative Identity | Wgt.(gms.) | Acid Identity | Wgt.(gms.) | Solvent Identity | Wgt.(gms.) |
|---|---|---|---|---|---|---|
| e | Polyoxyethylene (12) polyamine of Example J | 9.7 | Castor phthalate resin | 22.3 | Aromatic naphtha | 60 |
| f | " | 6.98 | " | 16.08 | " | 71.10 |
| g | " | 8.8 | Dimer acid | 11.0 | " | 70.2 |
| h | " | 5.15 | Castor phthalate resin | 11.85 | " | 73.0 |
| i | " | 36.3 | Oleic | 9.7 | — | 0 | ethylene (4) nonylphenol phosphates; polyoxyethylene (14) nonylphenol phosphates; polyoxyethylene (12) tridecyl alcohol phosphate, and polyoxyethylene (20) tridecyl alcohol phosphates have been found useful. Mono and diesters of these acids can be neutralized with alkaline metal, alkaline earth metal or nitrogen based salts, such as sodium, potassium, calcium, magnesium, amonium methylamine, ethylenediamine, ethanolamine, etc.

The alkyl, aryl and polyether esters of surphuric and sulphonic acids and their salts are readily available commercially. Some of the phosphoric acid salts are available but, if not, can be readily obtained by well-known processes. For example, the alkyl esters of orthophosphoric acid can be prepared expediciously by adding phosphorous pentoxide to an alcohol or a mixture of alcohols in mol ratios of from 3:1-5:1 calculated as mols of alcohol to mols of phosphorous pentoxide. For example, the alkyoxylated phenol ester of orthophosphoric acid can be prepared by first preparing the mixed mono/dialkyl ester of orthophosphoric acid and thereafter neutralizing the acid with alkali or alkaline earth metal bases, amonia or alkylamines, diamines and alkamolamines, etc. For example, polyoxyethylene (4) nonylphenol phosphoric acid derivatives can be made by adding P205 slowly to the phenol derivative over a period of several hours with agitation at a temperature ranging from 30°-60° C. An alkamolamine derivative can be made by adding a material such as monoethanolamine, to the above-described mixture with virgorous agitation to form the corresponding neutralized mixtures. Such materials are preferably made in petroleum distillate solvents so that the salts can be handled as a pourable solution.

The blends useful in forming the aqueous fuel oil dispersions of the invention contain 50 to 95% by weight of the above-described cationic surfactant; 5-50% by weight of the above-described anionic surfactant; and 5-50% by weight prepared in the above-described nonionic surfactant or 5-50% by weight of a mixture of nonionic and anionic surfactants. These surfactants are normally blended in up to 20% by weight of a mutual inert petroleum solvent such as; kerosene, benzene, petroleum ether, neutral spirits, naptha, and the like.

These emulsifier blends, including the weight of the inert solvent, are useful for forming stabilized water in fuel oil emulsions in combinations containing up to 50% water. Normally, concentrations of 2-15% by weight of the emulsifier blend based on the amount of water provides a suitable emulsion. In most instances 1 to 12% by weight of the blend is useful and preferably 2 to 10% by weight when a bituminous coal dust suspension is to be formed.

Fuel oils are described by the American Standards for Testing Materials in Bulletin ANSI/ASTM D 396-76. While grades number 1 through 6 can be emulsified satisfactorily by the emulsifier blend of the invention; grades 4, 5, and 6 are of particular interest since these are most often used in the stoking of commercial boilers. These materials have a flash point of about 55°-60° C. and a Saybolt viscosity measured at 38° C. of 45-9000. Since these materials normally have a high pour point temperature, they must be heated for storage to a temperature in excess of 15° C. and usually at a temperature of 50° C.

The burning characteristics of emulsified oil and emulsified oil/coal dust mixtures can be calculated directly from their individual percentage weights in the slurry and values as designated in ASTM Report D 407-44; ANSI/ASTM D 396-76; and ASTM D 388-66 contain calorific value limits in BtU/lb. which can be used to calculate the expected heat values per pound of aqueous oil/coal dust slurries. Suspensions containing up to about 60% coal dust can be obtained, however, those containing about 30% are most useful.

The water employed in manufacturing the slurries employing the emulsifier blend of the invention is not considered critical since brackish, pure, and sea water have been employed satifactorily. Fuel oil emulsions containing up to 30% water and more are obtained with the above-described blend.

While bituminous coal has a lower fixed carbon content than other commonly available coals, such as anthracite, as shown in Table VI, its density is sufficiently low due to its high porosity to permit its suspension more readily using an aqueous emulsifier blend of the invention. Water is soaked up in the pores and surrounds the particle surface. Compositions having 0.5 to 10% water are most operable as fuel oil suspensions since the loss in BTU/lb. due to the addition of greater amounts of water becomes uneconomic and unworkable. Coal dust containing oil slurries are best operated at 2-7% by weight water with optimum results at 4-6% water. Stable water-in-fuel oil emulsions are provided by the addition of 0.75-15% by weight of the water above-described emulsifier blend.

TABLE VI

| Coal Type | Source | Appearance | Particle Size[1] | Moisture[2] Content(%) | Settling[3] (Δ wt. %) |
|---|---|---|---|---|---|
| Wyoming bituminous | Big Horn Coal Co. Sheridan, WY | slightly brown | 89 | 16.0 | 9 |
|  |  |  | 80 | — | 14 |
|  |  |  | 66[4] | — | 15 |
| Illinois bituminous | Freeman-United Coal Mining Co. Chicago, IL | slightly gray, dull | 90 | 3.3 | 6 |
| Pennsylvania bituminous | Eddystone Power Plant (coal pile) Eddystone, PA | reddish | 92 | 1.2 | 3 |
| Pennsylvania anthracite | Beltrami Enterprises, Inc. Weatherly, PA | black, shiny | 85 | 2.2 | 26 |

[1]Weight percent through 200 mesh/inch screens.
[2]Dried 1 hour at 107° C. see ASTM Standard D3173-73.
[3]Settling of 30% coal, 10% water, # 6 fuel oil after 6 hours at 120° F.
[4]Ground with Denver rod mill.

While the invention employs particulate coal dust to demonstrate the applicability of the emulsifier blend suitable for forming bituminous coal dust/water in fuel oil emulsions, its use is not restricted thereto. Other particulate matter having a density no greater than 1.4 gm/cc such as inorganic catalysts, ground cellulose products, such as saw dust, ground nut shells, ground corn stalks, activated carbon and charcoal dust can be equally suspended if sufficiently porous to absorb water. The heat content of the oil is normally enhanced provided that the combustible materials dispersed therein are ground to a fine particle size. Best results are obtained with particles of less than 0.5 mils and preferably less than 0.074 mils, that is, less than 30 mesh and preferably less than 200 mesh U.S. sieve series.

EXAMPLE 1

The following ingredients are blended with mild agitation in ten parts by weight light petroleum solvent:
60 parts by weight of polyoxyethylene (12) nonylphenol/formaldehyde/diethylenetriamine monooleate condensation product as prepared in polyamine condensation product of Example i; 10.4 parts calcium dodecylbenzene sulfonate; 15.3 parts of a block ethylene oxide/propylene oxide copolymer attached to a $C_1$ $C_8$ alkanoxy moiety sold under the trademark TERGITOL XD by Union Carbide Corp., and 4.0 parts polyoxyethylene (11) nonylphenol.

EXAMPLE 2

AQUEOUS EMULSIONS CONTAINING COAL DUST

Two hundred grams of No. 6 fuel oil, as specified in ANSI/ASTM D 396-76 is placed in a 500 cc beaker and heated to 100°–120° F. on a steam bath. While the oil is stirred with a standard laboratory propeller type agitator rotating at 225 rpm, emulsifier, water and coal dust are added in sequence and stirred for about 5 minutes.

The slurries of coal and oil were evaluated on the basis of the amount of settling that had occurred after a period of time at 120° F. which is a typical bulk fuel oil storage temperature. Fifty grams of the slurry was stored at 120° F. for the specified times in a 50cc syringe that had the pointed end cut off. The slurry was then refrigerated at 30° F. at which temperature the slurry becomes a very viscous semi-solid. It was then possible to push the slurry out of the syringe and cut off samples. Samples weighing 5–6 grams were taken from the top and bottom of the slurry. The oil in each sample was then dissolved in 50 milliliters of hexane and the coal-/oil/hexane slurry was filtered through a Buchner funnel leaving the powdered coal on the filter paper. The weight of powdered coal was used to calculate the percentage coal in the coal/oil slurry. Settling ($\Delta$ weight percent) was reported as the difference in the weight percent solids between the top 5–6 gram sample and the bottom 5–6 gram sample. ($\Delta$ weight percent) equals percent solids at bottom minus percent solids at top of slurry. A $\Delta$ weight percent $\leq 5\%$ is considered stable.

In Tables VII and VIII are indicated slurry stabilities for various concentrations (0.125–2.0% based on weight of coal) of emulsifier for emulsions containing a 30 weight percent powdered Wyoming bituminous coal (80 weight percent passes 200 mesh screen U.S. Sieve); 5% water and 63–65% by weight Texaco No. 6 residual fuel oil. For example, the composition of Example 1 when present in the coal/water/oil slurry in concentrations of 0.5 percent by weight based on the weight of the coal or above produces stable emulsions wherein the $\Delta$ weight percent settling is less than 1.0% when held at 120° F. for a week. By comparison, when used alone, Preparations j, k, m, n, o, p, & q are not nearly as effective as their combinations with Preparation i as demonstrated in Examples 4–10. When no emulsifier is employed the $\Delta$ weight percent is found to be much greater than 40%.

TABLE VII

Fuel Oil Slurry Stability
30% Coal[1]/5% Water/63–65% #6 Fuel Oil Slurry Stability ($\Delta$ Wt. %) Tests
(1 Week At 120° F.)

| Example | Emulsifier Blend (Conc. wt.%[2]) | .125 | .25 | .5 | 1.0 | 2.0 |
|---|---|---|---|---|---|---|
| 2 | Preparation of Example 1 | 41.4 | 37.7 | 0.2 | 0.9 | — |
| 3 | Preparation of Example i | 39.0 | 38.3 | 6.7 | 0.9 | 2.1 |
| j | Ethylene oxide/propylene oxide block copolymer of butyl alcohol Sold by Union Carbide as Tergitol XD | 39.2 | 42.8 | 41.4 | 37.8 | 39.1 |
| k | Polyoxyethylene(11) nonylphenol | 51.2 | 48.5 | 44.3 | 33.5 | 34.8 |
| m | Calcium dodecylbenzene sulfonate | 48.1 | 36.4 | 42.8 | 44.0 | 41.2 |
| 4 | 50% Example i/50% Example m Surfact. | 40.4 | 10.3 | 13.0 | 21.0 | 31.2 |
| 5 | 50% Example i/50% Example j Surfact. | 42.5 | 38.9 | 37.1 | 22.4 | 2.0 |
| 6 | 50% Examle i/50% Example k Surfact. | 43.4 | 43.4 | 35.1 | 2.7 | 6.5 |
| 7 | 33% Example i/33% Example m/33% Ex. k | 42.0 | 39.9 | 12.6 | 3.8 | 14.2 |
| 8 | 33% Example i/33% Example j/33% Ex. m | — | 16.4 | 7.6 | 11.3 | 6.3 |

NOTES:
[1]Wyoming bituminous (80% by wt. < 200 mesh).
[2]Includes weight of inert petroleum solvent, weight % based on weight of coal.

TABLE VIII

Fuel Oil Slurry Stability
30% Coal[1]/10% Water/63–65% #6 Fuel Oil Slurry Stability Test ($\Delta$ Wt. %)
(24 hr. + 1 week at 120° F.)

| Example | Emulsifier Blend (Conc. Wt. %[2]) | 0.5(1Wk) | 1.0(1Wk) | 2.0(1Wk) | 2.0(24Hrs.) |
|---|---|---|---|---|---|
| Control | None | — | — | — | >40 |
| 9 | Blend of Example 1 | 0 | — | — | — |
| 10 | Composition of Example i | 1.0 | 1.0 | 1.0 | >1.0 |
| n | 23% Surfact Ex.m/42.5% Surf Ex. j/ 9.0% Surf. Ex.k/25% solvent | 25.0 | 3.0 | 1.0 | >1.0 |

TABLE VIII-continued

Fuel Oil Slurry Stability
30% Coal[1]/10% Water/63–65% #6 Fuel Oil Slurry Stability Test (Δ Wt. %)
(24 hr. + 1 week at 120° F.)

| Example | Emulsifier Blend (Conc. Wt. %[2]) | 0.5(1Wk) | 1.0(1Wk) | 2.0(1Wk) | 2.0(24Hrs.) |
|---|---|---|---|---|---|
| 0 | 54% Surfact. Ex.m/21% Surf. Ex.k/ 25% solvent | 42.0 | 8.0 | 3.0 | >1.0 |
| p | Polyoxyethylene (14) Nonylphenol | 37.0 | 4.0 | 1.0 | >1.0 |
| q | Polyoxyethylene (20) Tridecyl alcohol | 37.0 | 36.0 | 1.0 | >1.0 |

NOTES:
[1] 90% by wt. < 200 mesh Wyoming bituminous. [2] Wt. % based on weight of coal (including solvent)

Stability of bituminous coal dispersion is attributed to the formation of a water soaked dust particle which is surrounded by a layer of absorbed surface water which constitutes the aqueous phase. The formation of this aqueous layer permits the suspension of the particle in fuel oil with the use of the dispersing agent blends of the invention to form a water in oil emulsion. All low density porous particulate relatively hydrophilic matter is suspended in oil with these blends.

What is claimed is:

1. A blend useful in preparing stable aqueous fuel oil emulsions comprising:
   (a) compounds selected from a reaction product prepared by reacting:
      (1) from about 1 to about 300 mols of an alkyleneoxide
      (2) a mol of polyamine condensation product characterized by the general formula:

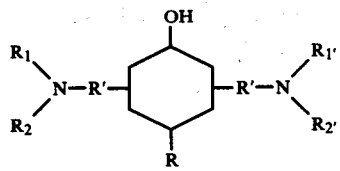

wherein R is an organic radical selected from the group consisting of alkyl and cycloalkyl radicals having from 4–12 carbon atoms, wherein R' is an alkylene radical, wherein $R_1$ and $R_1'$ are each selected from the group consisting of hydrogen and an acyclic hydrocarbon radical having from 1 to 18 carbon atoms and wherein $R_2$ and $R_2'$ are each organic alkylene polyamine radicals containing from 1 to 3 amine groups selected from the group consisting of primary and secondary amine groups, each of said amine group being separated from any other amine group in said composition by 2–6 carbon atoms, or an organic carboxylic acid salt of said reaction product; and at least one of the compounds selected from the group consisting of:
   (b) a nonionic compound prepared by reacting from about 10 to about 300 mols of an alkyleneoxide with hydroxyl containing compounds having 1–8 carbon atoms and alkyl phenols, wherein, the alkyl substituents have 2–15 carbon atoms; and
   (c) an anionic compound selected from alkyl, aryl, and polyoxypropylene and polyoxyethylene ether esters of sulphuric, sulphonic and phosphoric acids and inorganic and organic neutral salts thereof.

2. A composition of claim 1, wherein said polyamine condensation product of (a) is a reaction product of:
   (1) nonylphenol, (2) formaldehyde and (3) diethylenetriamine.

3. A composition of claim 2, wherein said amine condensation product includes about 12 mols of ethylene oxide per mol thereof.

4. A composition of claim 3, which is the reaction product of an organic carboxylic acid.

5. A composition of claim 4, wherein said carboxylic acid is oleic acid.

6. A composition of claim 1, wherein said nonionic compound is a block copolymer of polyoxyethylene and polyoxypropylene.

7. A composition of claim 1, wherein said nonionic compound is an ethoxylated alkyl phenol.

8. A composition of claim 7, wherein said nonionic compound is polyoxyethylene (11) nonylphenol.

9. A composition of claim 1, wherein said anionic compound is selected from phosphoric acid esters of ethoxylated nonylphenol and ethoxylated tridecyl alcohol having 4–20 mols of ethylene oxide per mol of alcohol.

10. A composition of claim 1, comprising 5 to 95% by weight polyoxyethylene (12) nonylphenol/formaldehyde/diethylenetriamine condensate monoleate; a minor portion of calcium dodecylbenzene sulfonate and a polyoxyalkylene glycol ether consisting of a hydrocarbon moiety of an aliphatic monohydric alcohol having 1 to 8 carbon atoms, said hydrocarbon moiety having attached thereto through an etheric oxygen linkage a heteric mixed chain of oxyethylene and 1,2-oxypropylene groups, the average molecular weight of said hydrophobe being at least 1000, and attached to said mixed chain a hydrophile consisting of a chain of oxyethylene groups the weight ratio of hydrophile to the hydrophobe being from 0.8:1–1.2:1.

11. A composition of claim 10, consisting essentially of 60% by weight polyoxyethylene (12) nonylphenol/formaldehyde/diethylenetriamine condensate monooleate, 10.4% calcium dodecylbenzene sulfonate; 15.3% of said polyoxyalkylene glycol ether and 4.0% polyoxyethylene (11) nonylphenol dissolved in 10.3% inert organic solvent.

12. A stable water-in-oil fuel oil emulsion having an aqueous phase and an oil phase containing a blend of claim 1.

13. A composition of claim 12, having dispersed therein a particulate solid having a particle size less than 0.15 millimeters of a density no greater than 1.4 grams/cc.

14. A composition of claim 13, wherein said particulate solid is coal dust.

15. A composition of claim 14, wherein said dust is bituminous coal.

16. A composition of claim 13, wherein said oil is selected from a group consisting of #4, 5, or 6 fuel oil.

17. A composition of claim 16, containing 0.5–10% water.

18. A composition of claim 17, containing 2-7% water.

19. A composition of claim 15, wherein a substantial amount of said coal dust is distributed in the aqueous-phase of said emulsion.

20. A composition of claim 14, having 5-60% by weight of said coal dust.

21. A composition of claim 20, having 30-50% by weight coal and 2-7% by weight water.

22. A composition of claim 13, wherein said particulate solid is primarily located in said aqueous phase.

23. A composition of claim 22, wherein said particulate solid is bituminous coal dust.

24. A composition of claim 22, wherein said 90% by weight of said coal dust passes through a 200 mesh U.S. sieve size screen.

25. A composite of claim 1 having 5-50% by weight of a compound selected from the group consists of (b) and (c).

26. An emulsion of claim 12, having 0.75-15% by weight based on the weight of the water of a blend of claim 1.

27. A composite of claim 21, having 0.125-2.0% by weight of said coal of said blend.

28. A water-in-fuel oil emulsion having suspended therein particulate coal having a particle size less than 0.15 millimeters and an essential cationic surfactant comprising compounds selected from a reaction product prepared by reacting:

(1) from about 1 to about 300 mols of an alkyleneoxide (2) a mol of polyamine condensation product characterized by the general formula:

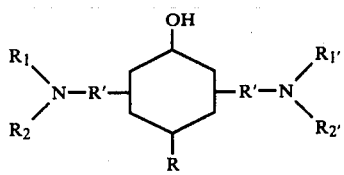

wherein R is an organic radical selected from the group consisting of alkyl and cycloalkyl radicals having from 4-12 carbon atoms, wherein R' is an alkylene radical, wherein $R_1$ and $R_1'$ are each selected from the group consisting of hydrogen and an acyclic hydrocarbon radical having from 1 to 18 carbon atoms and wherein $R_2$ and $R_2'$ are each organic alkylene polyamine radicals containing from 1 to 3 amine groups selected from the group consisting of primary and secondary amine groups, each of said amine group being separated from any other amine group in said composition by 2-6 carbon atoms, or an organic carboxylic acid salt of said reaction product; in a sufficient amount to suspend a substantial amount of said coal in the water phase.

29. An emulsion of claim 28, wherein said coal is bituminous.

30. An emulsion of claim 28, comprising 2-7% by weight based on the weight of the coal of a cationic surfactant which is an oleic acid salt of a condensation product of nonylphenol, formaldehyde, and diethylenetriamine.

* * * * *

UNITED STATES PATENT AND TRADEMARK OFFICE
CERTIFICATE OF CORRECTION

PATENT NO. : 4,162,143

DATED : July 24, 1979

INVENTOR(S) : Joseph B. Yount, III

It is certified that error appears in the above-identified patent and that said Letters Patent are hereby corrected as shown below:

Table II, Example M, Column heading Condensation Product of, "Example I" should read --Example L--.

Table II, Example H, Column heading Analysis Amine Eq., "181" should read --184--.

Table II, Example B, Column heading Alkylene Oxide, Ethylene Oxide, "3,703" should read --3,705--.

Table II, Example B, Column heading Analysis, OH Value, "413" should read --445--.

Table II, Example O, Column heading Analysis, Acid No., "1.6" should read --1.5--.

Table II, Example Q, Column heading Alkylene Oxide, Ethylene Oxide, "350" should read --380--.

Table II, Example O, Column heading Example No., "O", should read --U--.

UNITED STATES PATENT AND TRADEMARK OFFICE
CERTIFICATE OF CORRECTION

PATENT NO. : 4,162,143
DATED : July 24, 1979
INVENTOR(S) : Joseph B. Yount, III

It is certified that error appears in the above—identified patent and that said Letters Patent are hereby corrected as shown below:

Table III, Example c, Column heading Analysis, Acid No. "16.7" should read --15.7--.

Signed and Sealed this

First Day of January 1980

[SEAL]

Attest:

SIDNEY A. DIAMOND

Attesting Officer — Commissioner of Patents and Trademarks